(12) United States Patent
Paalanen et al.

(10) Patent No.: US 9,009,274 B2
(45) Date of Patent: *Apr. 14, 2015

(54) CONFIGURING A CLIENT APPLICATION

(71) Applicant: F-Secure Oyi, Helsinki (FI)

(72) Inventors: Jarkko Paalanen, Oulu (FI); Pekka Pehkonen, Oulu (FI); Timo Salmi, Oulu (FI)

(73) Assignee: F-Secure Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,623

(22) Filed: Mar. 29, 2013

(65) Prior Publication Data

US 2013/0318518 A1   Nov. 28, 2013

Related U.S. Application Data

(63) Continuation of application No. 12/587,592, filed on Oct. 8, 2009, now Pat. No. 8,443,059.

(51) Int. Cl.
| | |
|---|---|
| *G06F 15/177* | (2006.01) |
| *G06F 9/445* | (2006.01) |
| *H04L 12/24* | (2006.01) |
| *H04L 29/08* | (2006.01) |
| *H04W 4/00* | (2009.01) |
| *H04W 8/22* | (2009.01) |

(52) U.S. Cl.
CPC ............... *G06F 8/67* (2013.01); *H04L 41/082* (2013.01); *H04W 8/22* (2013.01); *H04L 67/303* (2013.01); *H04L 67/125* (2013.01); *H04W 4/001* (2013.01); *H04W 4/003* (2013.01)

(58) Field of Classification Search
CPC ... H04L 41/0816; H04L 63/102; H04L 67/10; H04L 67/1095; H04L 67/125; H04L 67/303
USPC .......................... 709/203, 219, 220, 221, 222
See application file for complete search history.

(56) References Cited

U.S. PATENT DOCUMENTS

| | | | | |
|---|---|---|---|---|
| 7,831,734 | B2 * | 11/2010 | Bernhard et al. ............. | 709/248 |
| 2007/0004393 | A1 * | 1/2007 | Forsberg et al. ............. | 455/420 |
| 2008/0194296 | A1 * | 8/2008 | Roundtree .................... | 455/558 |
| 2009/0181662 | A1 * | 7/2009 | Fleischman et al. .......... | 455/419 |
| 2011/0045828 | A1 * | 2/2011 | Madan et al. ................. | 455/433 |

FOREIGN PATENT DOCUMENTS

| | | |
|---|---|---|
| EP | 1748661 A1 | 1/2007 |
| EP | 1937009 A1 | 6/2008 |
| GB | 2428544 A | 1/2007 |

* cited by examiner

*Primary Examiner* — Liangche A Wang
(74) *Attorney, Agent, or Firm* — Harrington & Smith (57) ABSTRACT

A method of customizing an application on a device, the method comprising: at a server, receiving a request message from the device, while the device is running the application, the request message comprising information identifying the application and further information relating to a network operator associated with the device; using the further information to identify the network operator associated with the device and to obtain network operator specific customization information relating to the application; and sending a response message to the device, the response message comprising the obtained network operator specific customization information, the network operator specific customization information usable by the device to customize any of: the application components, application user interface, and application settings.

22 Claims, 5 Drawing Sheets

CONFIGURING A CLIENT APPLICATION

CROSS-REFERENCE TO RELATED APPLICATIONS

This application is a continuation of U.S. patent application Ser. No. 12/587,592, filed Oct. 8, 2009, the disclosure of which is incorporated herein by reference in its entirety.

TECHNICAL FIELD

The invention relates to the field of automatically configuring a client application at a device in a communications network.

BACKGROUND

Mobile devices can subscribe to services and content via a communication network. For example, a user of a device may wish to subscribe to a news feed, and any relevant news content will be automatically sent to the mobile device. Similarly, a mobile device may subscribe to an anti-virus service, and virus database updates are sent to the mobile device.

The Short Message Service (SMS) uses standard communications protocols to allow the exchange of short text messages between mobile devices, or between a mobile device and another node in a communication network such as a server. SMS based services are commonly used by mobile devices to subscribe to content or services. SMS services can be used to activate, subscribe to, update, and charge for content and services. SMS messages are delivered via a Short Message Service Centre (SMSC), which effectively provides a store-and-forward operation. When a user sends an SMS message to another user, the message is stored at the SMSC and delivered to the recipient when the recipient is next available which delivers it to the destination user when they are available.

The mobile device market is very fragmented, with many different types of device available to the user, and many different operators providing access networks for the device to attach to a communications network. The increasing number of options in terms of the mobile device and operator networks brings complexity in the system, as each operator introduces its own SMSC configuration and client to support the operation of a gateway. Any client application at the mobile device must be provided with operator-specific network settings to support an SMS based subscription. Each client application that is developed must be modified and given operator-specific settings. This means that separate operator variants are required for each application. The variants must be separately built, tested, signed, and published. The same problems are encountered when an update to the client application is published; updates must be provided in variants for different network operators.

A similar problem occurs because users have different devices. An application is configured for one type of device may not be optimally configured to work on another type of device. For example, different device firmware versions contain functional deviations, and client applications need to be able to adapt component functionality based on the firmware version.

SUMMARY

It is an object of the invention to overcome problems associated with configuring a client application depending on the operator network in which the device is being used.

According to a first aspect of the invention, there is provided a method of customizing an application on a device, the method comprising: at a server, receiving a request message from the device, while the device is running the application, the request message comprising information identifying the application and further information relating to a network operator associated with the device; using the further information to identify the network operator associated with the device and to obtain network operator specific customization information relating to the application; and sending a response message to the device, the response message comprising the obtained network operator specific customization information, the network operator specific customization information usable by the device to customize any of: the application components, application user interface, and application settings.

In one embodiment of the invention, the further information includes a Mobile Country Code (MCC) and a Mobile Network Code (MNC). In this case, the customization information is usable by the device to customize the application according to network operator requirements.

In an alternative embodiment of the invention, the further information includes an International Mobile Subscriber Identity (IMSI). In this case, the customization information is usable by the device to customize the application according to network operator requirements.

In a further alternative embodiment of the invention, the further information includes the IP address being used by the device. In this embodiment, the customization information can be used by the device to customize the application according to network operator requirements.

In another alternative embodiment, the further information may further include an International Mobile Equipment Identity (IMEI) specific to the device. In this embodiment, the customization information can be used by the device to customize the application according to the device type. Other device identifiers may also be used, such as manufacturer names and model numbers, serial numbers and so on.

As an option, the information identifying the application and the further information are sent from the device in an activation message to activate the application. However, this is not strictly necessary. For example, the invention may be implemented when the application receives a message that an update is available.

Either of the request message and the response message may be sent using Short Message Service (SMS) protocols, although it will be apparent that any suitable messaging protocol may be used.

In an embodiment of the invention, the request message comprises a Uniform Resource Locator (URL). The URL is made up of segments, including a segment identifying a domain from which the customization information can be obtained, a segment identifying the application and a segment, identifying the network operator associated with the device. The combined segments of the URL describe a path via which the customization information can be obtained.

According to a second aspect of the invention, there is provided a server for use in a communications network. The server is provided with a communications device for receiving a request message from a remote device while the device is running an application, the request message comprising information identifying the application and further information relating to a network operator associated with the device. A processor is provided for using the further information to identify the network operator associated with the device and to obtain network operator specific customization information relating to the application. The communications device is further arranged to send a response message to the device, the response message comprising the obtained network operator specific customization information, which can be used by the device to customize any of: the application components, application user interface, and application settings.

In one embodiment, the server is provided with a database. The database stores information identifying a plurality of network operators and, for each network operator, information identifying the application and network operator specific information relating to the application. The database may further store information identifying a plurality of device types and, for each device type, information identifying the application and device-specific information relating to the application.

The further information may comprise any of a MCC and MNC, an IP address being used by the device, and an IMSI. Where the further information further relates to the device type, it may further comprise an IMEI, although any type of device type identifier can be used.

In an embodiment of the invention, the request message may be sent as an activation message to activate the application, although there are circumstances described above in which the request message may be sent to, for example, request an update for the application.

According to a third aspect of the invention, there is provided a device for use in a communications network. The device is provided with a processor for generating a request message while an application is running. The request message includes information that identifies the application at the device, and further information relating to a network operator associated with the device. A transmitter is provided for sending the request message to a remote server. A receiver is also provided for receiving from the remote server a response message. The response message includes network operator specific customization information relating to the application. The processor is arranged to customize any of: the application components, application user interface, and application settings using the network operator specific customization information received in the response message.

The further information may include any of a MCC and a MNC, an IP address being used by the device, and an IMSI. In the case where the further information further relates to the device type, it may further include an IMEI specific to the device, although any device type identifier may be used, for example a manufacturer and model name.

In an embodiment of the invention, the request message may be sent as an activation message to activate the application, although there are circumstances described above in which the request message may be sent to, for example, request an update for the application.

According to a fourth aspect of the invention, there is provided a non-transitory computer readable medium storing a computer program which, when run on a server, causes the server to behave as a server as described above in the second aspect of the invention.

According to a fifth aspect of the invention, there is provided a non-transitory computer readable medium storing a computer program which, when run on a computer device, causes the computer device to behave as a device as described above in the third aspect of the invention.

DETAILED DESCRIPTION

Figure 1:
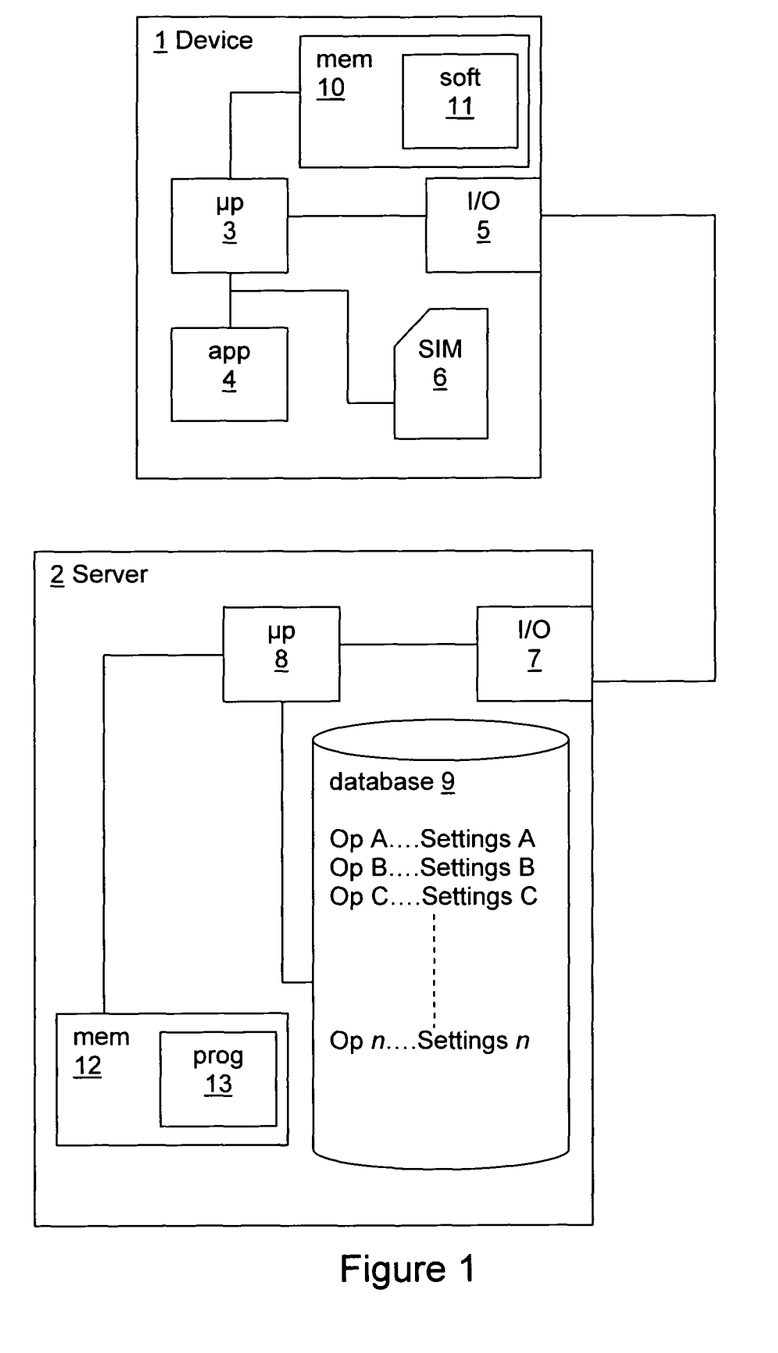
FIG. 1 illustrates schematically in a block diagram a client and a server according to a first embodiment of the invention.

According to a first specific embodiment of the invention, and referring to FIG. 1, there is illustrated a device 1 and a server 2. The device 1 has a processor 3 configured to run an application 4. A communications device 5 is provided to allow the device 1 to communicate with other nodes in a communications network. The device 1 may also be provided with a Subscriber Identity Module (SIM) 6 card. The SIM card 6 stores information including the following:
- a unique serial number that identifies the SIM card;
- an International Mobile Subscriber Identity (IMSI) that identifies the subscriber;
- temporary information related to the local network, which may include a temporary id that has been issued to the user;
- a list of the services accessible by the user;
- security authentication and ciphering information.

The invention supports automatic configuration of the client application 4 at the device 1 by identifying the user's operator. The user's operator may be any type of network operator, examples of which include a Mobile Network Operator (MO), a Virtual Mobile Network Operators (MVNO), an Internet Service Provider (ISP), and a local fixed line network owner. Automatic configuration allows the client application 4 to automatically adapt its functionality, look-and-feel, and settings to match local operator preferences. This dramatically shortens delivery time and maintenance efforts needed with mobile operator partners. Examples of settings that may be configured include customizing the client application components, user interface look-and-feel (for example co-branding, which may involve any of the name of the application, the name of the application provider, the name of network operator, and any relevant logos), and application settings (including network operator related settings).

In an embodiment of the invention, identification of the operator is performed using the IMSI. An IMSI is typically 15 digits long. The first three digits of the IMSI denote the Mobile Country Code (MCC), and the next two (in European standards) or three (in North American standards) digits denote the Mobile Network Code (MNC). The remaining digits denote the mobile station identification number (MSIN) within the identified network.

The client application obtains the MCC and the MNC from the SIM 6, and sends this in an activation message to the server 2 when the application is first activated. The server 2 receives the message at its communications device 7. The message is handled by a processor 8, which uses the MCC and the MNC to identify the network operator for the device 1. A database 9 is queried using the MCC and the MNC to obtain service settings for the client application 4 that are specific to the network operator. For example, operator A may require service settings A, operator B may require service settings B and so on. Note that FIG. 1 illustrates the database located at the server 2, although it could in an alternative embodiment be at a remote location from the server.

Once the service settings have been obtained, they are communicated to the device 1. The client application uses the operator-specific service settings to configure itself to ensure that it is operating in accordance with the requirements of the operator.

The above description assumes that the client application 4 is configured when it is first activated, although in an alternative embodiment this may occur at any time when the application 4 is run. This allows the client application 4 to change its configuration "on the fly" and take account of any changes to the operator-specific service settings.

Figure 2:
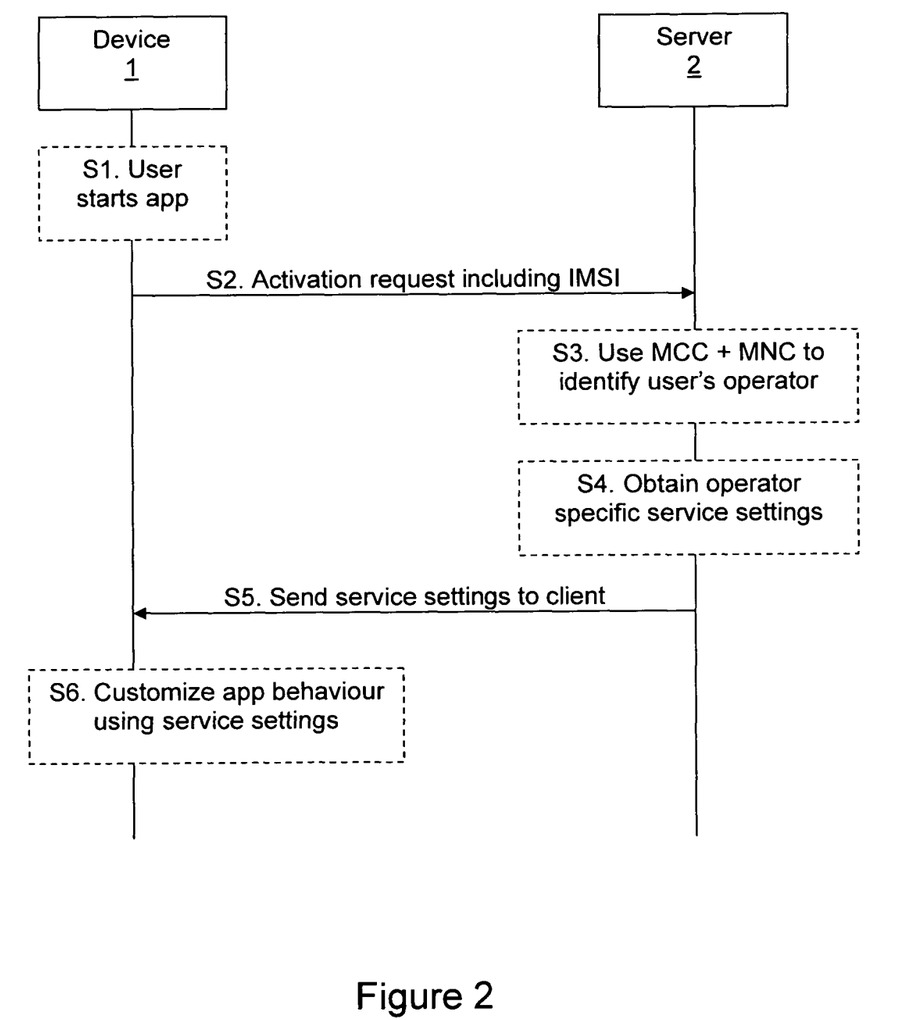
FIG. 2 is a signalling diagram illustrating signalling between a client and a server when the client starts a new application where the operator is identified using the MCC and MNC.

An example signalling diagram is illustrated in FIG. 2, with the following numbering corresponding to that of the figure:

S1. A user of the device starts the application 4.

S2. The device 1 sends an activation request to the server. The activation request includes the IMSI, or at least the MCC and MNC from the IMSI.

S3. The server uses the MCC and MNC to identify the user's operator.

S4. The identified operator is used to query a database in order to obtain operator-specific settings for the application. Of course, the database may simply be queried using the received MCC and MNC, in which case steps S3 and S4 are combined.

S5. The operator-specific settings are sent from the server 2 to the device 1.

S6. The application 4 at the device customises its behaviour on the basis of the received operator-specific settings.

The first specific embodiment of the invention can be applied to mobile devices and laptop PCs that have mobile networking capabilities (SIM card slot or a wireless DSL dongle). On such devices, applications can utilize the invention to customise their behaviour according to network operator-specific settings when they are run.

The invention may be implemented using hardware, as described above. Alternatively, the device may be provided with a memory 10 in which software 11 is stored to ensure that the device 1 can operate the invention. Similarly, the backend server 2 may also have a memory 12 storing software that, when run, causes the backend server 2 to behave as described above.

The MCC and MNC may be sent as part of a URL that links directly to the operator-specific settings obtainable by the server 2. For example, once the MCC and MNC have been obtained, a URL is sent in order to activate the application. The URL includes information identifying the application as well as the MCC and MNC. For example, when a user starts up an mobile security application, as described in S1 above, the URL http://mobile.f-secure.com/partners/234/15/mobile-security-os9x.sisx is generated and sent (according to S2 above) to the server. The URL breaks down as follows:

http://mobile.f-secure.com/partners defines the domain via which the operator-specific configuration information is obtainable.

234 is the MCC (in this example, the country code for the UK)

15 defines the MNC (in this example, the Vodafone® network).

Mobile-security-os9x.sisx defines the application.

The URL therefore describes a path to the required operator-specific settings that can be used by the server to obtain the settings before forwarding them to the user.

In some instances, the MNC and/or MCC may not be obtainable by the device, or may not have a corresponding entry in the database. In this case, the server redirects the query and provides generic or "safe" settings to the application.

Figure 3:
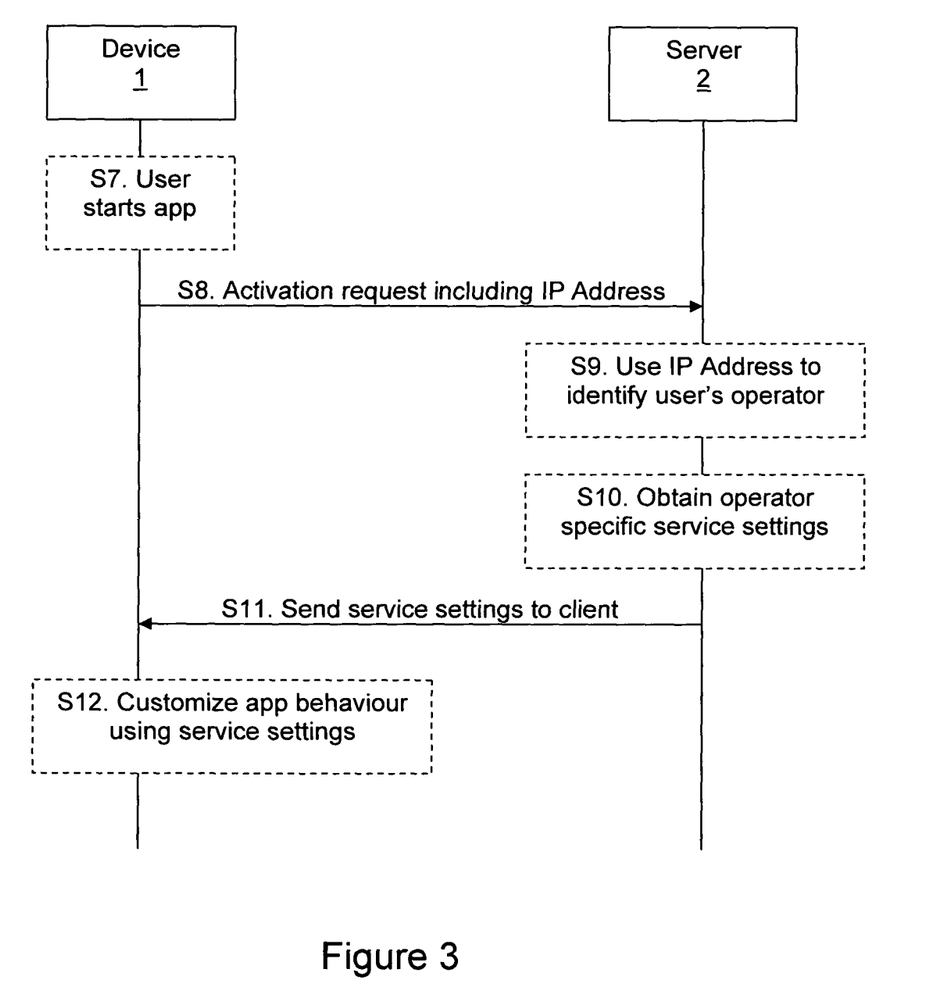
FIG. 3 is a signalling diagram illustrating signalling between a client and a server when the client starts a new application where the operator is identified using an IP address.

According to a second specific embodiment of the invention, the network operator is identified using the device's IP address rather than the MCC and the MNC. This allows the application 4 to be configured for other types of device in real time by identifying the country of access and the service provider. Each mobile operator or Internet service provider is allocated IP address space. This is used to identify the operator, as with the first specific embodiment of the invention, and to allow operator-specific settings to be sent to the device for configuring the application. The procedure is much that that described above, with reference to FIG. 2. FIG. 3 shows the procedure according to the second specific embodiment, with the following numbering corresponding to the numbering of FIG. 3:

S7. A user of the device starts the application 4.

S8. The device 1 sends an activation request to the server. The activation request includes the IP address currently being used by the device 1.

S9. The server uses the IP address to identify the user's operator.

S10. The identified operator is used to query a database in order to obtain operator-specific settings for the application. Of course, the database may simply be queried using the IP address, in which case steps S9 and S10 are combined.

S11. The operator-specific settings are sent from the server 2 to the device 1.

S12. The application 4 at the device customises its behaviour on the basis of the received operator-specific settings.

The second specific embodiment of the invention allows the application to be customised depending on operator settings even where a particular device does not have an IMSI.

Examples of customisation of operator settings include operator branding, functionality specific to the operator and so on.

According to a third specific embodiment, the client application is configured on the basis of the type of device that is being used. Each mobile device is preconfigured with an International Mobile Equipment Identity (IMEI). The IMEI is unique to every mobile device and is normally used in GSM networks to identify the device and compare the identity of the device with a blacklist of stolen devices.

An IMEI comprises 14 digits and a checksum. The first eight digits of the IMEI identify the manufacturer and model of the device being used. The database 9 accessed by the server, instead of or in addition to storing operator-specific settings, stores device-specific settings.

Figure 4:
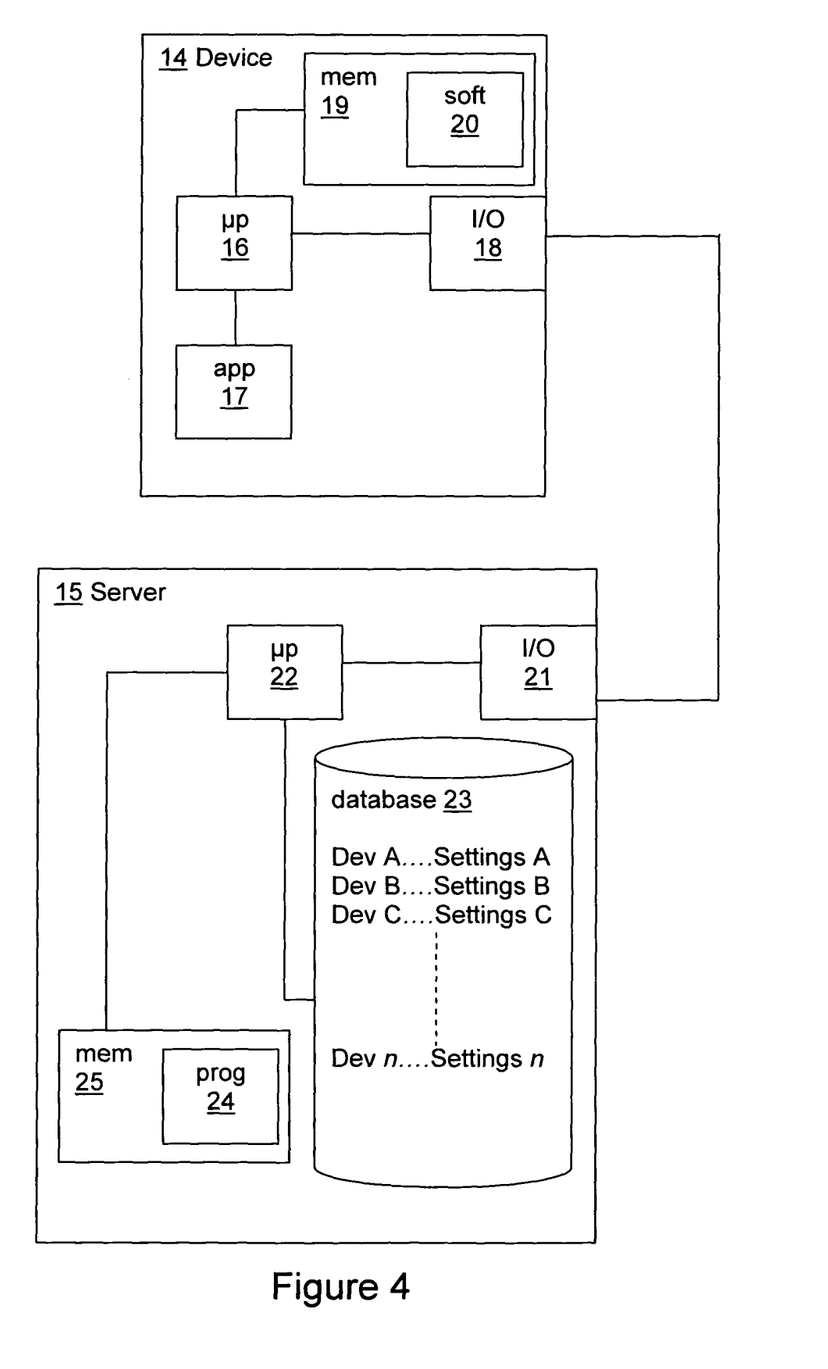
FIG. 4 illustrates schematically in a block diagram a client and a server according to a third embodiment of the invention.

Referring to FIG. 4, there is illustrated a device 14 and a server 15. The device 14 has a processor 16 configured to run an application 17. A communications device 18 is provided to allow the device 14 to communicate with other nodes in a communications network. The device also includes a memory 19. The memory 19 may store software 20 that allows the device to run. The device is provisioned with an IMEI which is maintained in a memory.

The invention supports automatic configuration of the client application 4 at the device 1 by identifying the manufacturer and the model of the device 14. This allows the client application 4 to automatically adapt its functionality, lookand-feel, and settings to match the requirements and capabilities of the device. This shortens delivery and upgrade time for the application 17.

The client application obtains the IMEI from the device 14, and sends this in an activation message to the server 15 when the application is first activated. The server 15 receives the message at its communications device 21. The message is handled by a processor 22, which uses the IMEI to identify the manufacturer and model of the device 14. A database 23 is queried using the IMEI to obtain service settings for the client application 4 that are specific to the device type. For example, device type A may require service settings A, device type B may require service settings B and so on.

Note that FIG. 4 illustrates the database 23 located at the server 15, although it could in an alternative embodiment be at a remote location from the server. Note also that much of the functionality of the server may be implemented using software, in which case a program 24 stored in a memory 25 is used to control the behaviour of the server 15.

Once the device-specific service settings have been obtained, they are communicated to the device 14. The client application 17 uses the device-specific service settings to configure itself to ensure that it is operating in accordance with the requirements and capabilities of the device.

The above description assumes that the client application 17 is configured when it is first activated, although in an alternative embodiment this may occur at any time when the application 17 is run. This allows the client application 17 to change its configuration "on the fly" and take account of any changes to the capabilities of the device (such as an upgrade to the device memory or firmware)

Figure 5:
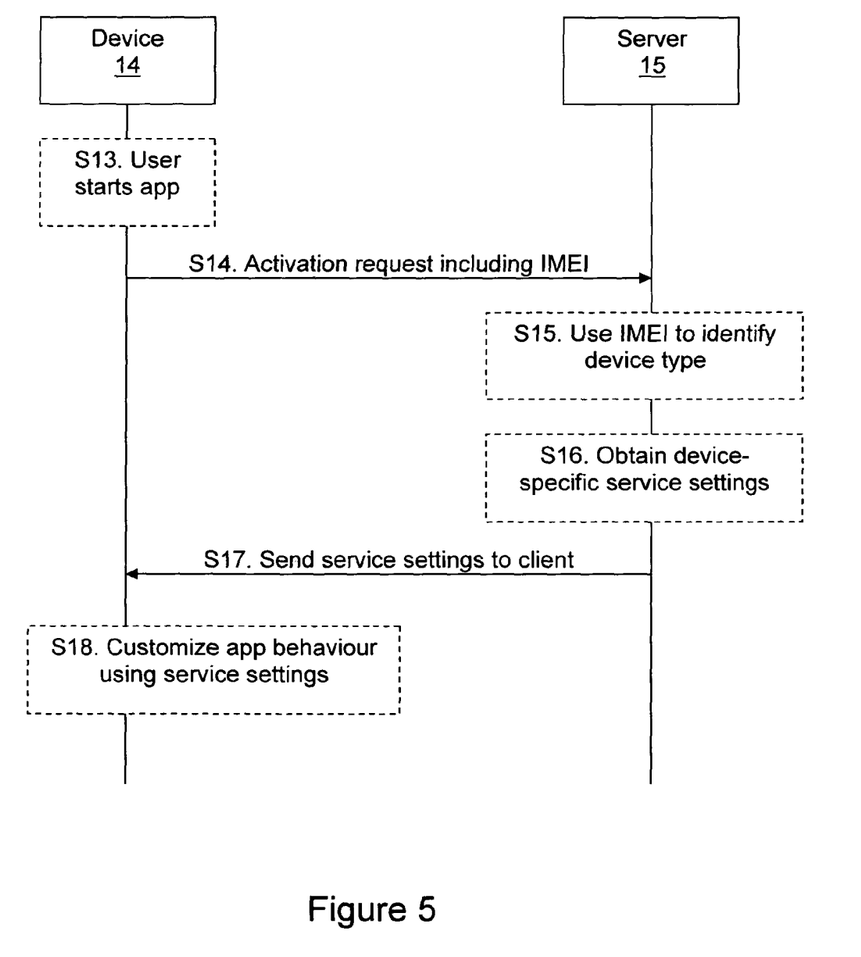
FIG. 5 is a signalling diagram illustrating signalling between a client and a server when the client starts a new application and the device is to be identified using the IMEI code of the device.

An example signalling diagram is illustrated in FIG. 5, with the following numbering corresponding to that of the figure:

S13. A user of the device starts the application 4.

S14. The device 1 sends an activation request to the server. The activation request includes the IMEI.

S15. The server uses the IMEI to identify the device type.

S16. The device type is used to query a database 23 in order to obtain device-specific settings for the application. Of course, the database may simply be queried using the received IMEI, in which case steps S15 and S16 are combined.

S17. The device-specific settings are sent from the server 15 to the device 14.

S18. The application 17 at the device 14 customises its behaviour on the basis of the received device-specific settings.

Note that whilst the first, second and third embodiments are all described separately, the invention could be implemented using any combination of the embodiments. For example, a server that implemented both the first and third specific embodiments would have a database that had both operator-specific settings and device-specific settings, meaning that an application could be configured by network operator and by device type in a single signalling operation.

The invention allows applications to be customised on activation, which removes the need to publish specific application variants for each network operator. This enables faster operator deliveries, and reduces the number of client application variants by utilizing the same binary for different operators and device types. The invention also allows changes to settings and business logic without updating the actual client application, and allows easier and cost efficient maintenance when an update to the application is published, as it is sufficient to only publish one update and operator-specific changes or device-specific changes.

It will be appreciated by the person of skill in the art that various modifications may be made to the above-described embodiments without departing from the scope of the invention. For example, the above description describes identifying the network operator using the MCC and MNC, but it will be apparent that any type of identifier may be used. For example, a MSISDN number may be used to identify the network operator.

The invention claimed is:

1. A method of customizing an application on a device, the method comprising:

at a server, receiving a request message from the device, while the device is running the application, the request message comprising information identifying the application and further information relating to a network operator associated with the device;

using the further information to identify the network operator associated with the device and to obtain network operator specific customization information relating to the application; and sending a response message to the device, the response message comprising the obtained network operator specific customization information, the network operator specific customization information usable by the device to customize any of: the application components, application user interface, and application settings.

2. The method according to claim 1, wherein the further information comprises a Mobile Country Code and a Mobile Network Code, and the customization information is usable by the device to customize the application according to network operator requirements.

3. The method according to claim 1, wherein the further information comprises an International Mobile Subscriber Identity, and the customization information is usable by the device to customize the application according to network operator requirements.

4. The method according to claim 1, wherein the further information comprises the IP address being used by the device, and the customization information is usable by the device to customize the application according to network operator requirements.

5. The method according to claim 1, wherein the further information further relates to the device type and comprises an International Mobile Equipment Identity specific to the device, and the customization information comprises information usable by the device to configure the application according to the device type.

6. The method according to claim 1, wherein the information identifying the application and the further information are sent from the device in an activation message to activate the application.

7. The method according to claim 1, wherein either of the request message and the response message are sent using Short Message Service protocols.

8. The method according to claim 1, wherein the request message comprises a Uniform Resource Locator, URL, the URL comprising a segment identifying a domain from which the customization information can be obtained, a segment identifying the application, and a segment identifying the network operator associated with the device, the combined segments describing a path via which the customization information can be obtained.

9. A server for use in a communications network, the server comprising:

a communications device configured to receive a request message from a remote device while the device is running an application, the request message comprising information identifying the application and further information relating to a network operator associated with the device; and a processor configured to use the further information to identify the network operator associated with the device and to obtain network operator specific customization information relating to the application;

wherein the communications device is further configured to send a response message to the device, the response message comprising the obtained network operator specific customization information, the network operator specific customization information usable by the device to customize any of: the application components, application user interface, and application settings.

10. The server according to claim 9, further comprising a database, the database comprising information identifying a plurality of network operators and, for each network operator, information identifying the application and network operator specific information relating to the application.

11. The server according to claim 9, further comprising a database, the database comprising information identifying a plurality of device types and, for each device type, information identifying the application and device-specific information relating to the application.

12. The server according to claim 9, wherein the further information comprises a Mobile Country Code and a Mobile Network Code.

13. The server according to claim 9, wherein the further information comprises an IP address being used by the device.

14. The server according to claim 9, wherein the further information further relates to the device type and comprises an International Mobile Equipment Identity specific to the device.

15. The server according claim 9, wherein the request message comprises an activation message to activate the application.

16. A device for use in a communications network, the device comprising:

a processor configured to generate a request message while the device is running an application, the request message comprising information identifying the application and further information relating to a network operator associated with the device;

a transmitter configured to send the request message to a remote server; and a receiver configured to receive from the remote server a response message, the response message comprising network operator specific customization information relating to the application;

wherein the processor is further configured to customize any of: the application components, application user interface, and application settings using the network operator specific customization information received in the response message.

17. The device according to claim 16, wherein the further information comprises a Mobile Country Code and a Mobile Network Code.

18. The device according to claim 16, wherein the further information comprises an IP address being used by the device.

19. The device according to claim 16, wherein the further information further relates to the device type and comprises an International Mobile Equipment Identity specific to the device.

20. The device according to claim 16, wherein the request message comprises an activation message to activate the application.

21. A non-transitory computer readable medium storing a computer program which, when run on a server, causes the server to behave as a server according to claim 9.

22. A non-transitory computer readable medium storing a computer program which, when run on a computer device, causes the computer device to behave as a device according to claim 16.

* * * * *